United States Patent
Liu et al.

(10) Patent No.: US 12,119,864 B2
(45) Date of Patent: Oct. 15, 2024

(54) RAPID BLUETOOTH NETWORKING METHOD AND SYSTEM AND BLUETOOTH EARPHONES

(71) Applicant: Shanghai Wu Qi Microelectronics Co., Ltd., Shanghai (CN)

(72) Inventors: Da Liu, Shanghai (CN); Zhiyong Xu, Shanghai (CN); Xian Wu, Shanghai (CN); Zhijie Tang, Shanghai (CN)

(73) Assignee: SHANGHAI WU QI MICROELECTRONICS CO., LTD., Shanghai (CN)

( * ) Notice: Subject to any disclaimer, the term of this patent is extended or adjusted under 35 U.S.C. 154(b) by 196 days.

(21) Appl. No.: 18/052,703

(22) Filed: Nov. 4, 2022

(65) Prior Publication Data
US 2023/0074888 A1    Mar. 9, 2023

Related U.S. Application Data

(63) Continuation of application No. PCT/CN2021/113216, filed on Aug. 18, 2021.

(30) Foreign Application Priority Data

Mar. 12, 2021   (CN) .................. 202110272157.X

(51) Int. Cl.
*H04B 1/713*   (2011.01)
*H04R 1/10*    (2006.01)
*H04W 4/80*    (2018.01)

(52) U.S. Cl.
CPC .............. *H04B 1/713* (2013.01); *H04R 1/10* (2013.01); *H04W 4/80* (2018.02); *H04R 2420/07* (2013.01)

(58) Field of Classification Search
CPC .......... H04B 1/713; H04B 2201/71346; H04B 2201/71353; H04B 2201/71361; H04W 4/80; H04R 1/10; H04R 5/033; H04R 5/0335
See application file for complete search history.

(56) References Cited

U.S. PATENT DOCUMENTS

| | | | |
|---|---|---|---|
| 10,149,340 B1 * | 12/2018 | Rabii | B64D 11/00153 |
| 10,939,481 B1 * | 3/2021 | Liu | H04W 68/005 |
| 2016/0157078 A1 * | 6/2016 | Palin | H04W 4/80 |
| | | | 455/41.2 |

(Continued)

*Primary Examiner* — Khanh C Tran
(74) *Attorney, Agent, or Firm* — HAUPTMAN HAM, LLP

(57) ABSTRACT

A rapid Bluetooth networking method is applied to a Bluetooth communication system, the Bluetooth communication system includes Bluetooth earphones and a terminal, and the Bluetooth earphones include a master earphone and a slave earphone. The rapid Bluetooth networking method includes: when the master earphone is started and in an idle state, carrying out frequency hopping to a preset channel; carrying out, by the master earphone, carrier detection on a preset channel to detect whether the preset channel is idle, and if yes, transmitting an identifier (ID) packet to the slave earphone, an initial frequency of the slave earphone being the preset channel; and automatically entering, under the condition that the slave earphone is started and receives the ID packet, a subsequent process that Slave receives the ID packet transmitted by Master in a Page process, the slave earphone being the Slave, and the master earphone being the Master.

10 Claims, 3 Drawing Sheets

(56) References Cited

U.S. PATENT DOCUMENTS

| | | | | |
|---|---|---|---|---|
| 2017/0245285 A1* | 8/2017 | Palin | ............... | H04W 40/246 |
| 2017/0372600 A1* | 12/2017 | Palin | ............... | H04W 4/80 |
| 2024/0090049 A1* | 3/2024 | Xu | ............... | H04W 4/80 |

* cited by examiner

RAPID BLUETOOTH NETWORKING METHOD AND SYSTEM AND BLUETOOTH EARPHONES

RELATED APPLICATIONS

The present application is a Continuation of International Application No. PCT/CN2021/113216, filed Aug. 18, 2021, and claims priority from Chinese Application Number 202110272157.X, filed Mar. 12, 2021, the disclosure of which are hereby incorporated by reference herein their entireties.

TECHNICAL FIELD

The present disclosure relates to the technical field of Wireless Bluetooth, in particular to a rapid Bluetooth networking method and system and Bluetooth earphones.

BACKGROUND ART

As Bluetooth wireless communication technology develops, Bluetooth earphones are more convenient to use than traditional wired earphones because no earphone cable is required to connect them with a mobile phone. Thus, Bluetooth earphones are popular in the market in recent years. Bluetooth earphones have evolved from the original single earphone type to current dual earphone type. In addition, after a period of development, richer features are available. For example, only a call feature is supported before, but now music playing, speech assistant and even heart rate monitoring can be realized. True wireless stereo (TWS) earphones are Bluetooth earphones with a wireless connection between the left earphone and the right earphone. Since there is no connecting cable between the left earphone and the right earphone, the TWS earphones are more free and convenient to wear, and consequently become a new trend of Bluetooth earphones.

The left earphone and the right earphone of the TWS earphones serve as a master earphone and a slave earphone respectively. For the wireless connection between the master earphone and the slave earphone at present, mainstream manufacturers all employ the Bluetooth technology. However, since the Bluetooth technology adopts a frequency hopping mechanism, when a Bluetooth connection between the master earphone and the slave earphone is established, a series of link establishment processes defined by Bluetooth specifications such as Inquiry and Page of standard Bluetooth are required. The processes are specifically as follows:

in an Inquiry process, Master transmits an identifier (ID) packet in an Inquiry Scan Physical Channel in a Master-to-Slave slot (Master-to-Slave time slot) in a frequency hopping mode. If Slave is in an Inquiry Scan state, it will carry out frequency hopping at a relatively slow speed in the Inquiry Scan Physical Channel and monitor the reception situation of the ID packet. If the Master and the Slave meet each other in the same channel at a certain time point, that is, the Slave receives the ID packet from the Master, the Master and the Slave will synchronize with each other. After receiving the ID packet from the Master, the Slave will transmit a frequency hopping synchronization (FHS) packet to the Master in the Slave-to-Master slot. The FHS packet contains basic information of the Slave, such as Bluetooth address, name and clock. After the Master receives the HIS packet transmitted by the Slave, a Page process is started.

In the Page process, the Master transmits an ID packet to the Slave in a Page Scan Physical Channel in a Master-to-Slave slot. Similarly, when the Master and the Slave meet each other in the same channel at a certain time point, that is, the Slave receives the ID packet from the Master, subsequent actions for Bluetooth connection establishment are carried out by the Master and the Slave. In the whole process, the Master will use A-train and B-train frequency hopping sequences.

Therefore, it usually takes hundreds of milliseconds to several seconds to establish a connection between the master earphone and the slave earphone, which will affect user experience in some application scenarios. Especially, if the master earphone is connected with a terminal, Bluetooth connection establishment between the slave earphone and the master earphone is likely to affect communication between the master earphone and the terminal.

SUMMARY

An objective of the present disclosure is to provide a rapid Bluetooth networking method and system and Bluetooth earphones, which may rapidly establish a Bluetooth connection, so as to omit processes such as Inquiry and Page of standard Bluetooth required when an existing master earphone and slave earphone establish a Bluetooth connection, and a Bluetooth link between the master earphone and a terminal is not affected.

Basic solution 1 provided in the present disclosure: a rapid Bluetooth networking method. The rapid Bluetooth networking method is applied to a Bluetooth communication system, the Bluetooth communication system includes Bluetooth earphones and a terminal, and the Bluetooth earphones include a master earphone and a slave earphone. The rapid Bluetooth networking method includes:

carrying out frequency hopping to a preset channel when the master earphone is started and in an idle state;

carrying out, by the master earphone, carrier detection on the preset channel to detect whether the preset channel is idle, and if yes, transmitting an identifier (ID) packet to the slave earphone, an initial frequency of the slave earphone being the preset channel; and automatically entering, under the condition that the slave earphone is started and receives the ID packet, a subsequent process that Slave receives an ID packet transmitted by Master in a Page process, the slave earphone being the Slave, and the master earphone being the Master.

Beneficial effects of the basic solution 1:1. Compared with a traditional Bluetooth connection establishment process of a master earphone and a slave earphone of Bluetooth earphones, the solution reduces interference of frequency hopping of the master earphone and the slave earphone. The master earphone transmits the ID packet in the preset channel, and the initial frequency of the slave earphone is the preset channel, such that under the condition that the slave earphone is taken out of a charging bin or approaches a Bluetooth connection range of the master earphone when the master earphone transmits the ID packet, the slave earphone may immediately receive the ID packet transmitted by the master earphone, so as to automatically enter a subsequent process that Slave receives an ID packet transmitted by Master in a Page process. Under the condition that when the slave earphone is taken out of the charging bin or approaches the Bluetooth connection range of the master earphone, the master earphone does not transmit an ID packet, since the master earphone transmits the ID packet in the preset channel as long as the master earphone is in the idle state, and a probability that when the slave earphone carries out frequency hopping, the slave earphone receives an ID packet transmitted by the master earphone in the same channel at a certain time point is higher than a probability that when the master earphone and the slave earphone both carry out frequency hopping, the slave earphone receive an ID packet transmitted by the master earphone in the same channel at the certain time point, the master earphone and the slave earphone may more rapidly realize Bluetooth networking.

2. When the master earphone is in the idle state, frequency hopping is carried out to the preset channel, carrier detection is carried out on the preset channel, and whether the preset channel is idle is detected, and if yes, the ID packet is transmitted to the slave earphone instead of directly transmitting the ID packet to the slave earphone after frequency hopping. Carrier detection is carried out on the preset channel first, so as to prevent the situation that since the preset channel continues transmitting an ID packet after being occupied, a conflict is caused.

3. When the master earphone is in the idle state, frequency hopping is carried out to the preset channel to transmit an ID packet, so as to prevent communication between the master earphone and the terminal from being affected and guarantee that the Bluetooth link between the master earphone and the terminal is not damaged.

Further, in the idle state, there is no Bluetooth connection of the master earphone and the slave earphone at present, or there is a Bluetooth connection between the master earphone and the terminal at present and no audio stream between the master earphone and the terminal.

Beneficial effects: in the idle state that there is no Bluetooth connection of the master earphone and the slave earphone at present, or there is a Bluetooth connection between the master earphone and the terminal at present, time of the idle state of the master earphone is abundant, frequency hopping of the master earphone is simple, and a connection is rapid.

Further, in the idle state, there is a Bluetooth connection between the master earphone and the terminal at present and a telephone speech audio stream between the master earphone and the terminal, a Bluetooth link being a synchronous connection-oriented/extended synchronous connection-oriented (SCO/eSCO) link; under the condition that no packet loss happens to the Master and the Slave, an entire Retransmission Window period is defined as an ID Space (ID transmission window); and under the condition that packet loss happens to the Master and the Slave, an interval between two eSCO Window periods is defined as an ID Space, and the master earphone is in the idle state in the ID Space, the Master being the master earphone or the terminal, and the Slave being the master earphone or the terminal.

Beneficial effects: according to Bluetooth specification definition, under the condition that no packet loss happens during Bluetooth transmission, Master of Bluetooth and Slave of Bluetooth do not transmit data in the Retransmission Window; and under the condition that packet loss happens to the Master of Bluetooth and the Slave of Bluetooth, the Master and the Slave will retransmit previous data packets in the Retransmission Window. In addition, since SCO/eSCO packets are transmitted in the eSCO Window, the SCO/eSCO packets do not occupy all Slots (time slots) on a whole timeline. Therefore, there are a plurality of idle and available slots between any two eSCO Windows, and under the condition that the Bluetooth link is the SCO/eSCO link, two situations are considered for frequency hopping of the master earphone. That is, under the condition that no packet loss happens to the Master and the Slave, an entire Retransmission Window period is defined as an ID Space. Under the condition that packet loss happens to the Master and the Slave, an interval between two eSCO Window periods is defined as an ID Space, and the master earphone is in the idle state in the ID Space, so as to prevent the situation that since the master earphone carries out frequency hopping, the Bluetooth connection between the master earphone and the terminal is affected.

Further, in the idle state, there is a Bluetooth connection between the master earphone and the terminal at present and an audio stream between the master earphone and the terminal, a Bluetooth link being an asynchronous connection-oriented link (ACL). Under the condition that the master earphone is the Master, a situation that the master earphone does not transmit a data packet and does not receive a data packet transmitted by the terminal serving as the Slave is defined as an ID Space, and the master earphone is in the idle state in the ID Space. Under the condition that the master earphone is the Slave, the master earphone monitors a packet header of a data packet transmitted by the terminal serving as the Master, and under the condition that it is monitored that a destination of the data packet is not the master earphone, the master earphone enters the ID Space, the master earphone is in the idle state in the ID Space, and after the ID Space is finished, the master earphone carries out frequency hopping again to a channel between the master earphone and the terminal to monitor a next data packet.

Beneficial effects: in the situation that there is a Bluetooth connection between the master earphone and the terminal at present and an audio stream between the master earphone and the terminal, a Bluetooth link being an asynchronous connection-oriented link (ACL), under the condition that the master earphone is the Master, since actual audio transmission occupies a small proportion of time, the master earphone serving as the Master has abundant time to acquire the data packet transmitted by the mobile phone serving as the Slave, and thus, a situation that the master earphone does not transmit a data packet and does not receive a data packet transmitted by the terminal serving as the Slave is defined as an ID Space, and the master earphone is in the idle state in the ID Space. Under the condition that the master earphone is the Slave, the master earphone monitors a packet header of a data packet transmitted by the terminal serving as the Master, and under the condition that it is monitored that a destination of the data packet is not the master earphone, the master earphone enters the ID Space, the master earphone is in the idle state in the ID Space, and after the ID Space is finished, the master earphone carries out frequency hopping to a channel between the master earphone and the terminal to monitor a next data packet, so as to prevent the situation that since the master earphone transmits an ID packet due to frequency hopping, Bluetooth transmission between the master earphone and a terminal device is affected.

Further, the master earphone carries out frequency hopping to the preset channel at a preset transmission frequency, and under the condition that the master earphone is not in the idle state when carrying out frequency hopping to the preset channel at the preset transmission frequency, the master earphone waits for a next idle state to carry out frequency hopping to the preset channel.

Beneficial effects: according to an actual connection state of the master earphone and the slave earphone, the situations in which the master earphone is in the idle state are greatly different, such that the master earphone is configured to carry out frequency hopping to the preset channel at the preset transmission frequency. Thus, a frequency of transmitting the ID packet by the master earphone is reduced, so as to reduce power consumption of the master earphone, and thereby saving energy.

Further, under the condition that there are other devices transmitting data in the preset channel, the master earphone determines, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued.

Beneficial effects: in an actual environment, there may be other devices transmitting data in the preset channel, the master earphone determines, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued. Therefore, a conflict is prevented when the ID packet is transmitted, and transmission between the master earphone and the terminal is guaranteed.

Basic solution 2 provided in the present disclosure: a rapid Bluetooth networking system. The rapid Bluetooth networking system includes a master Bluetooth device and a slave Bluetooth device, the master Bluetooth device includes an idleness detection module, a carrier detection module and a master Bluetooth connection module, and the slave Bluetooth device includes a slave Bluetooth connection module.

The idleness detection module is used for detecting whether the master Bluetooth device is in an idle state, and if yes, the master Bluetooth connection module is triggered to carry out frequency hopping to a preset channel.

The carrier detection module is used for carrying out carrier detection on the preset channel to detect whether the preset channel is idle, and if yes, the master Bluetooth connection module is triggered to transmit an ID packet to the slave Bluetooth connection module of the slave Bluetooth device, an initial frequency of the slave Bluetooth device being the preset channel.

Under the condition that the slave Bluetooth connection module of the slave Bluetooth device receives the ID packet, the master Bluetooth connection module and the slave Bluetooth connection module automatically enter a subsequent process that Slave receives an ID packet transmitted by Master in a Page process, the slave Bluetooth device being the Slave, and the master Bluetooth device being the Master.

Beneficial effects of basic solution 2: compared with traditional Bluetooth networking, the solution may rapidly connect the master Bluetooth device with the slave Bluetooth device without affecting Bluetooth links established between the master Bluetooth device and other devices having a Bluetooth connection function. Moreover, when a Bluetooth connection is established between the master Bluetooth device and the slave Bluetooth device, the processes of the standard Bluetooth such as Inquiry and Page required when a Bluetooth connection is established between an existing master Bluetooth device and slave Bluetooth device are omitted, so as to improve a speed of establishing a Bluetooth connection between the master Bluetooth device and the slave Bluetooth device.

Further, the idleness detection module detects whether the master Bluetooth device is in the idle state at the preset transmission frequency, and if not, the idleness detection module waits to detect a next idle state.

Beneficial effects: according to actual connection states of the master Bluetooth device and the slave Bluetooth device, the situations in which the master Bluetooth device earphone is in the idle state are greatly different, such that the idleness detection module detects whether the master Bluetooth device is in the idle state at the preset transmission frequency, and if not, the idleness detection module waits to detect a next idle state. Therefore, a frequency of transmitting the ID packet by the master Bluetooth device is reduced, so as to reduce power consumption of the master Bluetooth device, thereby saving energy.

Further, the master Bluetooth connection module is further used for detecting whether there are other devices transmitting data in the preset channel, and determining, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued.

Beneficial effects: a conflict is prevented when the ID packet is transmitted, and a Bluetooth link established between the master Bluetooth device and other devices having a Bluetooth connection function is not affected.

Basic solution 3 provided in the present disclosure: Bluetooth earphones. The Bluetooth earphones include a memory and a processor, the memory is used for storing a computer program, and the processor is used for executing the computer program to implement steps of any one of the above rapid Bluetooth networking methods.

Beneficial effects of basic solution 3: compared with traditional Bluetooth earphones, the solution may rapidly connect the master earphone and the slave earphone of the Bluetooth earphones, and transmission between the master earphone and the terminal is not affected.

DETAILED DESCRIPTION OF THE EMBODIMENTS

Further descriptions will be provided in detail below by means of specific implementations:

Embodiment 1

Figure 1:
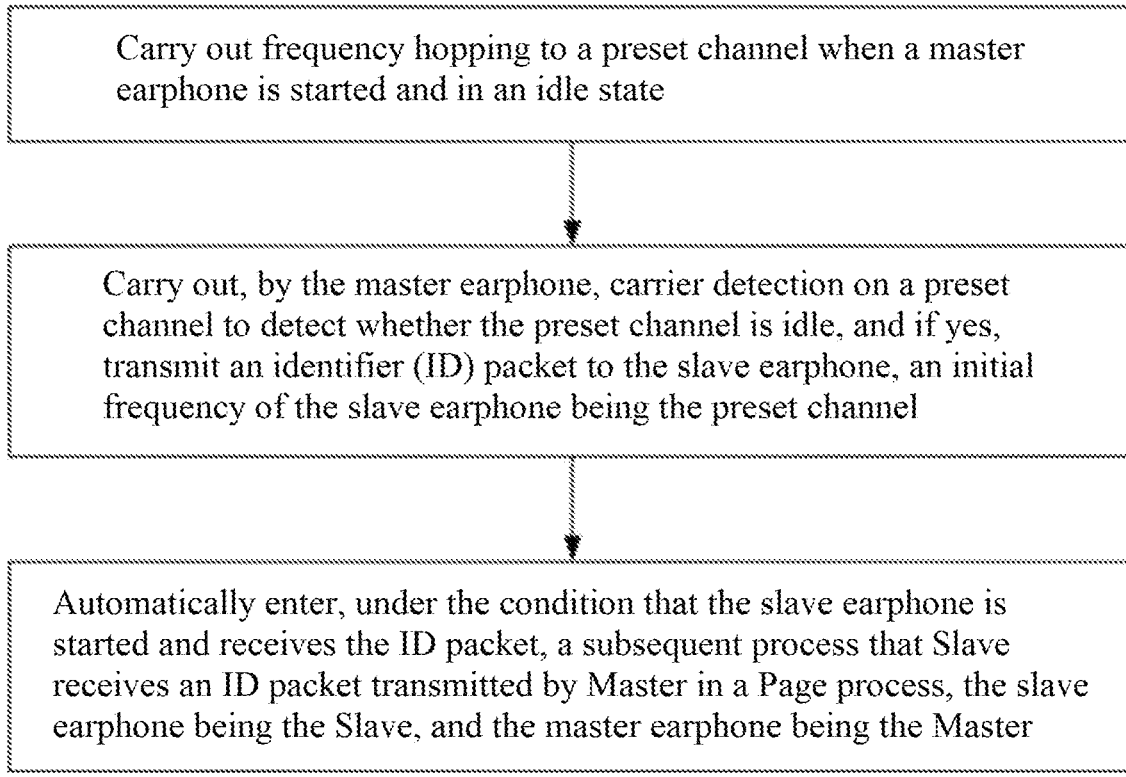
FIG. 1 is a flow diagram of an embodiment of a rapid Bluetooth networking method in the present disclosure.

The embodiment is basically as shown in FIG. 1: a rapid Bluetooth networking method. The rapid Bluetooth networking method is applied to a Bluetooth communication system, the Bluetooth communication system includes Bluetooth earphones and a terminal, the Bluetooth earphones in the embodiment are true wireless stereo (TWS) Bluetooth earphones, and the Bluetooth earphones include a master earphone and a slave earphone. The rapid Bluetooth networking method includes:

carry out frequency hopping to a preset channel when the master earphone is started and in an idle state, the preset channel being capable of any one of 79 channels of Bluetooth frequency hopping;

carry out, by the master earphone, carrier detection on the preset channel to detect whether the preset channel is idle, and if yes, transmit an identifier (ID) packet to the slave earphone, an initial frequency of the slave earphone being the preset channel, where a traditional method for determining signal energy of a channel is used for carrier detection, and if the signal energy is less than a preset quantity, it is considered that the channel is idle; and automatically enter, under the condition that the slave earphone is started and receives the ID packet, a subsequent process that Slave receives an ID packet transmitted by Master in a Page process, the slave earphone being the Slave, and the master earphone being the Master.

The idle state may be specifically divided into four situations:

a first situation is that there is no Bluetooth connection of the master earphone and the slave earphone at present;

a second situation is that there is a Bluetooth connection between the master earphone and the terminal at present and no audio stream between the master earphone and the terminal;

a third situation is that there is a Bluetooth connection between the master earphone and the terminal at present and a telephone speech audio stream between the master earphone and the terminal, the Bluetooth link being a synchronous connection-oriented/extended synchronous connection-oriented (SCO/eSCO) link; and a fourth situation is that there is a Bluetooth connection between the master earphone and the terminal at present and an audio stream between the master earphone and the terminal, the Bluetooth link being an asynchronous connection-oriented link (ACL).

In the idle states of the first two situations, the time of the idle state of the master earphone is abundant, and by executing the rapid Bluetooth networking method, the master earphone may be rapidly connected with the slave earphone by directly carrying out frequency hopping to the preset channel.

Figure 2:
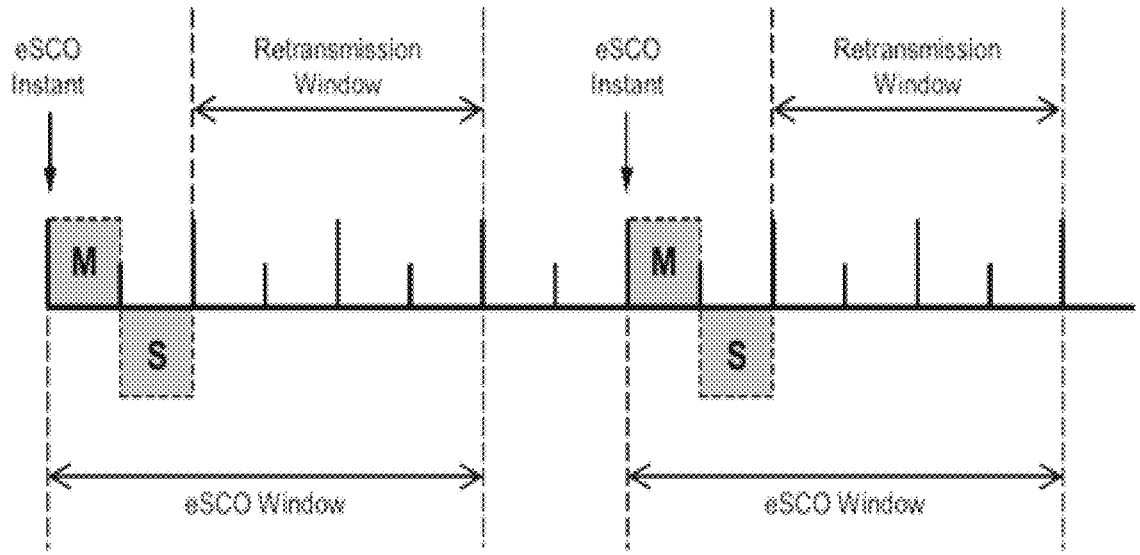
FIG. 2 is a schematic diagram of a transmission time sequence of a typical telephone speech audio stream in an embodiment of a rapid Bluetooth networking method in the present disclosure.
Figure 3:
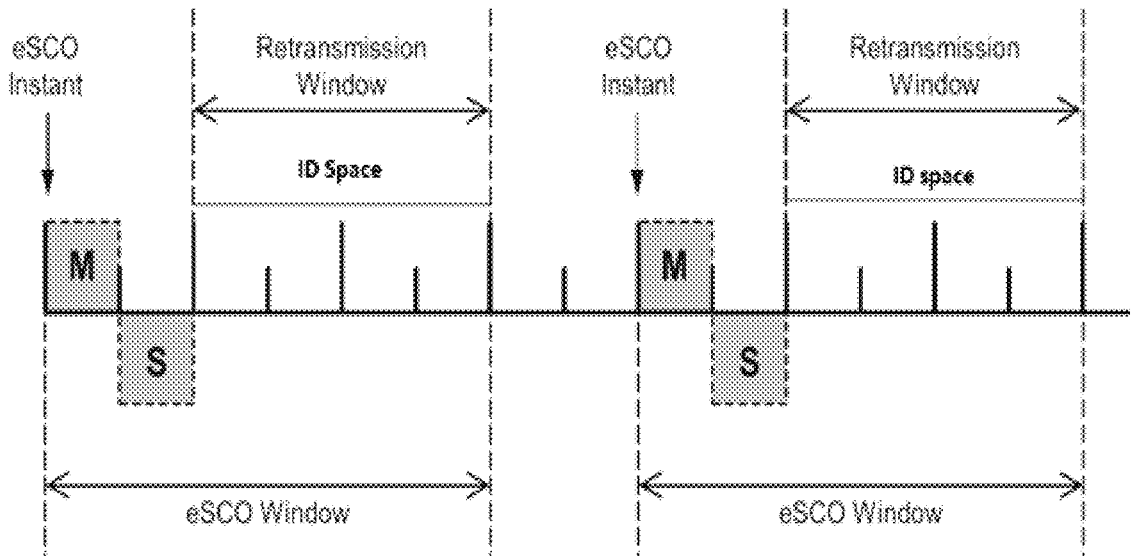
FIG. 3 is a schematic diagram of an identifier (ID) space under the conditions that a Bluetooth link is a synchronous connection-oriented/extended synchronous connection-oriented (SCO/eSCO) link and no packet loss happens to Master and Slave in an embodiment of a rapid Bluetooth networking method in the present disclosure.

In the idle state of the third situation, under the condition that there is a Bluetooth connection between the master earphone and the terminal at present and a telephone speech audio stream between the master earphone and the terminal, a Bluetooth link being an SCO/eSCO link, according to Bluetooth specifications, it is necessary to consider that no packet loss happens to Master and Slave. A transmission time sequence of a typical telephone speech audio stream is as shown in FIG. 2. In FIG. 2, eSCO Instant represents synchronous link time. Under the condition that no packet loss happens during Bluetooth transmission, Master (M in FIGS. 2-4) and Slave (S in FIGS. 2-4) do not transmit data in the Retransmission Window. Under the condition that packet loss happens to the Master and the Slave, Master and the Slave will retransmit previous data packets in the Retransmission Window. In addition, since data packets are transmitted in the eSCO Window, the data packets do not occupy all Slots (time slots) on a whole timeline. Therefore, there are a plurality of idle and available slots between any two eSCO Windows, and under the condition that the Bluetooth link is the SCO/eSCO link, two situations are considered for frequency hopping of the master earphone:

under the condition that no packet loss happens to the Master and the Slave, the entire Retransmission Window period is defined as an ID Space, which is as shown in FIG. 3.

Figure 4:
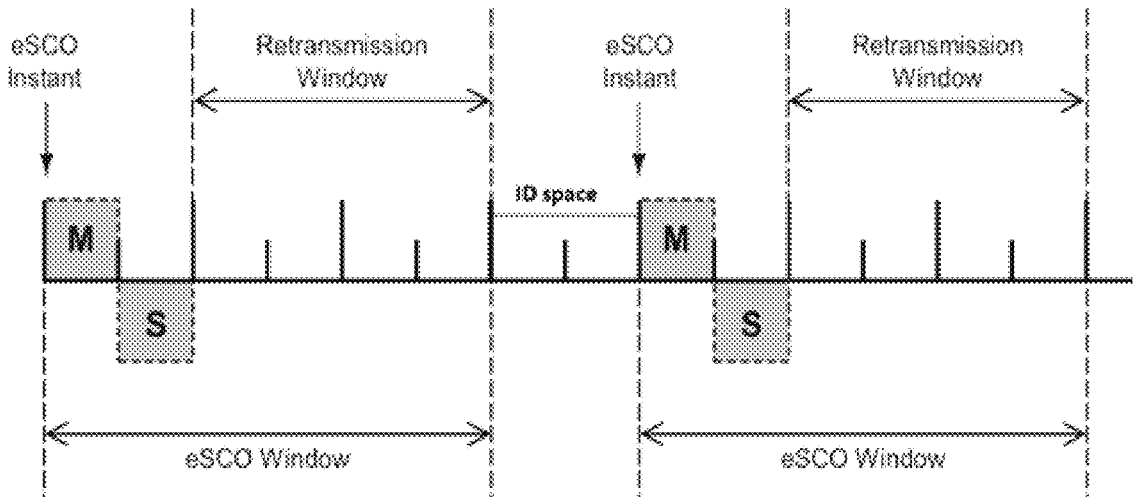
FIG. 4 is a schematic diagram of an ID space under the conditions that a Bluetooth link is an SCO/eSCO link and packet loss happens to Master and Slave in an embodiment of a rapid Bluetooth networking method in the present disclosure.

Under the condition that packet loss happens to the Master and the Slave, an interval between the two eSCO Window periods is defined as an ID Space, and the master earphone is in the idle state in the ID Space, which is as shown in FIG. 4.

Master is the master earphone or terminal, and Slave is the master earphone or terminal.

In the idle state of the fourth situation, that is, there is a Bluetooth connection between the master earphone and the terminal at present and an audio stream between the master earphone and the terminal, the Bluetooth link being an asynchronous connection-oriented link (ACL), considering scheduling features of the ACL, it is necessary to consider the following two situations, in which whether the master earphone is Master:

under the condition that the mast earphone is the Master, a situation that the master earphone does not transmit a data packet and does not receive a data packet transmitted by a terminal serving as Slave is defined as an ID Space, and the master earphone is in the idle state in the ID Space. For example, there is an advanced audio distribution profile audio stream between the master earphone and the terminal, a data packet on an ACL may usually carry audio data of 20 ms-30 ms, and such a data packet may be transmitted in 3 slots-5 slots (1.875 ms-3.125 ms), and actual audio transmission occupies a small proportion of time, such that the master earphone serving as the Master has abundant time to acquire the data packet transmitted by the terminal serving as the Slave, and carries out, in the idle state, frequency hopping to the preset channel to transmit the ID packet.

Figure 5:
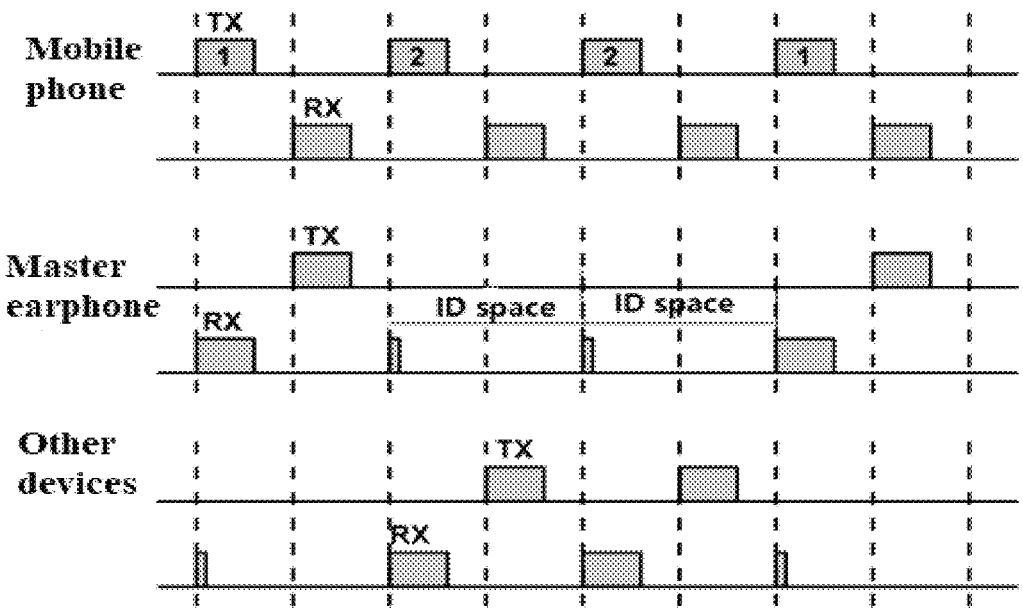
FIG. 5 is a schematic diagram of an ID Space under the condition that a Bluetooth link is an asynchronous connection-oriented link (ACL) and a master earphone is Slave in an embodiment of a rapid Bluetooth networking method in the present disclosure.

Under the condition that the master earphone is the Slave, the master earphone monitors a packet header of a data packet transmitted by the terminal serving as the Master, and under the condition that it is monitored that a destination of the data packet is not the master earphone, the master earphone enters the ID Space, the master earphone is in the idle state in the ID Space, and after the ID Space is finished, the master earphone carries out frequency hopping again to a channel between the master earphone and the terminal to monitor a next data packet. Since audio data between the terminal and the master earphone only occupies a small part of a transmission bandwidth, the terminal may be in communication with other communication devices in the remaining time, such that the master earphone may monitor that a destination of the data packet is not the master earphone. Under the condition that the master earphone does not just enter the ID Space, as shown in FIG. 5, when the terminal transmits a data packet (TX1 in FIG. 5), the master earphone will transmit an ACK data packet to the mobile phone (master earphone TX in FIG. 5) according to Bluetooth specifications. At this time, under the condition that the TX packet of the terminal is transmitted to other devices (other devices in FIG. 5), the master earphone will monitor a packet header of the data packet at start time of the data packet (TX2 in FIG. 5). Under the condition that the master earphone finds that a transmission destination specified by bits in the packet header is not the master earphone, the master earphone enters the ID space. After entering the ID space, the master earphone will carry out frequency hopping to the preset channel to transmit the ID packet. After the ID space is finished, the master earphone carries out frequency hopping again to return to the channel of the terminal to monitor a next data packet. Under the condition that the master earphone finds that a destination is the master earphone, master earphone continues receiving complete data packets.

For the above four idle states, the master earphone carries out frequency hopping to the preset channel at a preset transmission frequency, and under the condition that the master earphone is not in the idle state when carrying out frequency hopping to the preset channel at the preset transmission frequency, the master earphone waits for a next idle state to carry out frequency hopping to the preset channel, so as to reduce power consumption of the master earphone, thereby saving energy.

Under the condition that there are other devices transmitting data in a preset channel, the master earphone determines, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued. Specifically, after the master earphone carries out frequency hopping to the preset channel, the master earphone carries out carrier detection. Under the condition that it is detected that the preset channel is not idle, carrier detection is carried out all the time. After it is detected that other devices complete transmission, the master earphone continues to wait for interframe space (IFS) that is set according to actual situations and has negligible influence on time of an ID packet. Under the condition that no other device transmits data during the IFS, the master earphone transmits the ID packet to the slave earphone. Under the condition that time of transmitting data by other devices is long, and the remaining time of the ID space is not enough to satisfy time of ID packet transmission, the master earphone will transmit the ID packet established at present in advance to return to the channel in Bluetooth connection with the terminal. Moreover, under the condition that the time of the ID space may not satisfy time cost of one time of frequency hopping of the master earphone, the master earphone will not carry out frequency hopping, so as to guarantee transmission between the master earphone and the terminal.

Embodiment 2

Figure 6:
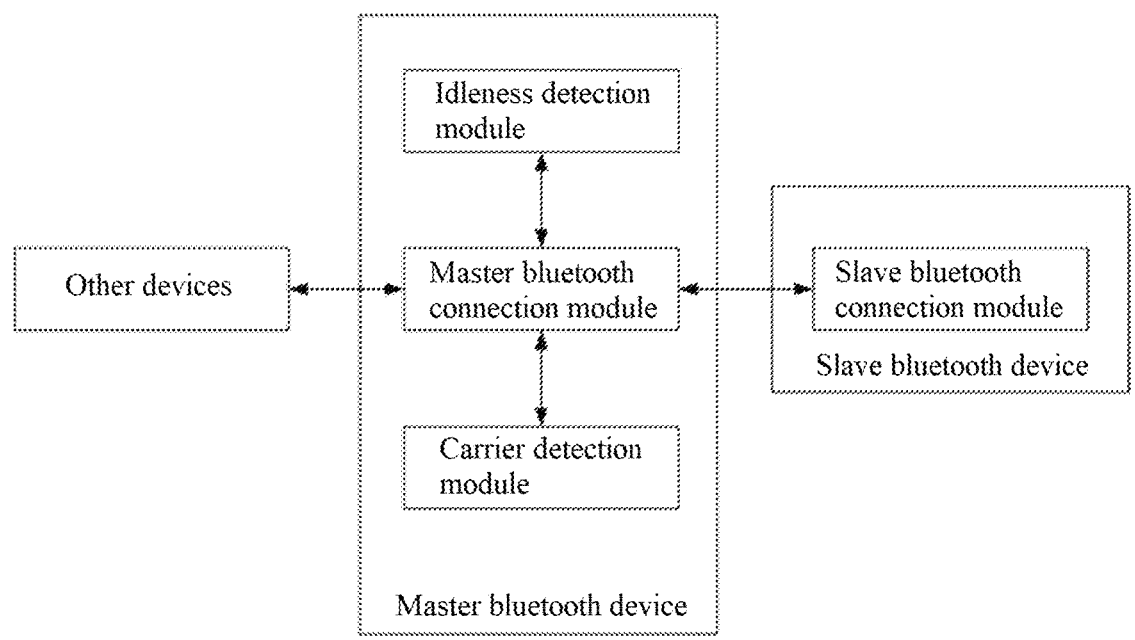
FIG. 6 is a logic block diagram of an embodiment of a rapid Bluetooth networking system in the present disclosure.

The embodiment is basically as shown in FIG. 6: a rapid Bluetooth networking system. The rapid Bluetooth networking system includes a master Bluetooth device and a slave Bluetooth device, the master Bluetooth device includes an idleness detection module, a carrier detection module and a master Bluetooth connection module. The slave Bluetooth device includes a slave Bluetooth connection module.

The idleness detection module is used for detecting whether the master Bluetooth device is in an idle state, and if yes, the master Bluetooth connection module is triggered to carry out frequency hopping to a preset channel. The idleness detection module detects whether the master Bluetooth device is in the idle state at the preset transmission frequency, and if not, the idleness detection module waits to detect a next idle state.

The carrier detection module is used for carrying out carrier detection on the preset channel to detect whether the preset channel is idle, if yes, the master Bluetooth connection module is triggered to transmit an ID packet to the slave Bluetooth connection module of the slave Bluetooth device, an initial frequency of the slave Bluetooth device being the preset channel.

Under the condition that the slave Bluetooth connection module of the slave Bluetooth device receives the ID packet, the master Bluetooth connection module and the slave Bluetooth connection module automatically enter a subsequent process that Slave receives an ID packet transmitted by Master in a Page process, the slave Bluetooth device being the Slave, and the master Bluetooth device being the Master.

The master Bluetooth connection module is further used for detecting whether there are other devices transmitting data in the preset channel, and determining, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued.

Embodiment 3

The embodiment provides Bluetooth earphones. The Bluetooth earphones include a memory and a processor, the memory is used for storing a computer program, and the processor is used for executing the computer program to implement steps of any one of the above rapid Bluetooth networking methods.

What is described above is only the embodiments of the present disclosure, and the common general knowledge such as the known specific structures and features in the solutions is not described in detail herein. A person skilled in the art knows all the common technical knowledge in the technical field to which the present disclosure belongs before the filing date or the priority date, can know all the prior art in the art, and has the ability to apply the conventional experimental means before the date. A person skilled in the pertained field can improve and implement, under the inspiration of the present disclosure, the solutions in combination with its own ability. Some typical known structures or known methods should not be an obstacle for a person skilled in the art to implement the present disclosure. It shall be noted that for a person skilled in the art, they can also make several transformations and improvements on the premise of not deviating from the structures of the present disclosure, and these transformations and improvements shall fall within the scope of protection of the present disclosure and will not affect the implementation affect of the present disclosure and the utility of the patent. The scope of protection claimed by the present disclosure shall be subject to the contents of the claims, and the detailed description and other records in the description can be used to interpret the contents of the claims.

What is claimed is:

1. A rapid Bluetooth networking method, applied to a Bluetooth communication system, wherein the Bluetooth communication system comprises Bluetooth earphones and a terminal, the Bluetooth earphones comprise a master earphone and a slave earphone, and the method comprises:

carrying out frequency hopping to a preset channel when the master earphone is started and in an idle state;

carrying out, by the master earphone, carrier detection on the preset channel to detect whether the preset channel is idle, if yes, transmitting an identifier (ID) packet to the slave earphone, an initial frequency of the slave earphone being the preset channel; and automatically entering, under the condition that the slave earphone is started and receives the ID packet, a subsequent process that Slave receives an ID packet transmitted by Master in a Page process, the slave earphone being the Slave, and the master earphone being the Master.

2. The rapid Bluetooth networking method according to claim 1, wherein in the idle state, there is no Bluetooth connection of the master earphone and the slave earphone at present, or there is a Bluetooth connection between the master earphone and the terminal at present and no audio stream between the master earphone and the terminal.

3. The rapid Bluetooth networking method according to claim 1, wherein in the idle state, there is a Bluetooth connection between the master earphone and the terminal at present and a telephone speech audio stream between the master earphone and the terminal, a Bluetooth link being a synchronous connection-oriented/extended synchronous connection-oriented (SCO/eSCO) link; under the condition that no packet loss happens to the Master and the Slave, an entire Retransmission Window period is defined as an ID Space; and under the condition that packet loss happens to the Master and the Slave, an interval between two eSCO Window periods is defined as an ID Space, and the master earphone is in the idle state in the ID Space, the Master being the master earphone or the terminal, and the Slave being the master earphone or the terminal.

4. The rapid Bluetooth networking method according to claim 1, wherein in the idle state, there is a Bluetooth connection between the master earphone and the terminal at present and an audio stream between the master earphone and the terminal, the Bluetooth link being an asynchronous connection-oriented link (ACL); under the condition that the master earphone is the Master, a situation that the master earphone does not transmit a data packet and does not receive a data packet transmitted by the terminal serving as the Slave is defined as an ID Space, and the master earphone is in the idle state in the ID Space; and under the condition that the master earphone is the Slave, the master earphone monitors a packet header of a data packet transmitted by the terminal serving as the Master, and under the condition that it is monitored that a destination of the data packet is not the master earphone, the master earphone enters the ID Space, the master earphone is in the idle state in the ID Space, and after the ID Space is finished, the master earphone carries out frequency hopping again to a channel between the master earphone and the terminal to monitor a next data packet.

5. The rapid Bluetooth networking method according to claim 2, wherein the master earphone carries out frequency hopping to a preset channel at a preset transmission frequency, and under the condition that the master earphone is not in the idle state when carrying out frequency hopping to the preset channel at the preset transmission frequency, the master earphone waits for a next idle state to carry out frequency hopping to the preset channel.

6. The rapid Bluetooth networking method according to claim 3, wherein under the condition that there are other devices transmitting data in a preset channel, the master earphone determines, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued.

7. A rapid Bluetooth networking system, comprising a master Bluetooth device and a slave Bluetooth device, wherein the master Bluetooth device comprises an idleness detection module, a carrier detection module and a master Bluetooth connection module; the slave Bluetooth device comprises a slave Bluetooth connection module;

the idleness detection module is used for detecting whether the master Bluetooth device is in an idle state, if yes, the master Bluetooth connection module is triggered to carry out frequency hopping to a preset channel;

the carrier detection module is used for carrying out carrier detection on the preset channel to detect whether the preset channel is idle, and if yes, the master Bluetooth connection module is triggered to transmit an ID packet to the slave Bluetooth connection module of the slave Bluetooth device, an initial frequency of the slave Bluetooth device being the preset channel; and under the condition that the slave Bluetooth connection module of the slave Bluetooth device receives the ID packet, the master Bluetooth connection module and the slave Bluetooth connection module automatically enter a subsequent process that Slave receives an ID packet transmitted by Master in a Page process, the slave Bluetooth device being the Slave, and the master Bluetooth device being the Master.

8. The rapid Bluetooth networking system according to claim 7, wherein the idleness detection module detects whether the master Bluetooth device is in an idle state at a preset transmission frequency, and if not, the idleness detection module waits to detect a next idle state.

9. The rapid Bluetooth networking system according to claim 7, wherein the master Bluetooth connection module is further used for detecting whether there are other devices transmitting data in the preset channel, and determining, according to time of transmitting data by the other devices in the preset channel, time of transmitting the ID packet, time cost of one time of frequency hopping and time of the ID space, whether to stop ID packet transmission established at present in advance, if yes, ID packet transmission is stopped, and if not, ID packet transmission is continued.

10. Bluetooth earphones, comprising a memory and a processor, wherein the memory is used for storing a computer program; and the processor is used for executing the computer program to implement steps of the rapid Bluetooth networking method of claim 1.

* * * * *